United States Patent
Buendgen (12) 
(10) Patent No.: US 12,189,776 B2
(45) Date of Patent: Jan. 7, 2025

(54) UPDATING SECURE GUEST METADATA OF A SPECIFIC GUEST INSTANCE

(71) Applicant: INTERNATIONAL BUSINESS MACHINES CORPORATION, Armonk, NY (US)

(72) Inventor: Reinhard Theodor Buendgen, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 18/159,698

(22) Filed: Jan. 26, 2023

(65) Prior Publication Data

US 2024/0176885 A1 May 30, 2024

(30) Foreign Application Priority Data

Nov. 28, 2022 (GB) ..................................... 2217785

(51) Int. Cl.
*G06F 21/00* (2013.01)
*G06F 9/455* (2018.01)
(Continued)

(52) U.S. Cl.
CPC ........ *G06F 21/572* (2013.01); *G06F 9/45545* (2013.01); *G06F 9/45558* (2013.01);
(Continued)

(58) Field of Classification Search
CPC ............... G06F 21/572; G06F 9/45545; G06F 9/45558; G06F 21/575; G06F 21/64;
(Continued)

(56) References Cited

U.S. PATENT DOCUMENTS

2020/0076607 A1* 3/2020 Allen .................... H04L 9/3234
2020/0159940 A1 5/2020 Werner
(Continued)

FOREIGN PATENT DOCUMENTS

CN 109324872 A 2/2019

OTHER PUBLICATIONS

Dietrich et al., "Towards Customizable, Application Specific Mobile Trusted Modules" STC '10: Proceedings of the fifth ACM workshop on Scalable trusted computing, pp. 31-40 (Year: 2010).*
(Continued)

*Primary Examiner* — Morshed Mehedi
(74) *Attorney, Agent, or Firm* — Heather Johnston (57) ABSTRACT

A method for securely modifying metadata of a secure guest instance that is personalized by an initialization code, using firmware that maintains metadata of the secure guest is disclosed. The method comprises starting a secure guest instance using a hypervisor, receiving, by the secure guest instance, user-specific data, and personalizing, by the secure guest instance, the secure guest instance using the user-specific data. The method comprises also receiving, by the secure guest instance, a request structure for modifying the metadata of the secure guest instance, verifying partially, by the secure guest instance, the request structure using the user-specific data and upon successful verification passing the request structure to the trusted firmware for modifying the metadata of the secure guest instance, and verifying, by the trusted firmware, the request structure and upon success modifying the metadata, as specified by the request structure.

25 Claims, 7 Drawing Sheets

(51) Int. Cl.
*G06F 21/57* (2013.01)
*G06F 21/64* (2013.01)

(52) U.S. Cl.
CPC ............ *G06F 21/575* (2013.01); *G06F 21/64* (2013.01); *G06F 2009/45575* (2013.01); *G06F 2221/033* (2013.01)

(58) Field of Classification Search
CPC ..... G06F 2009/45575; G06F 2221/033; G06F 21/57; G06F 2009/45587
See application file for complete search history.

(56) References Cited

U.S. PATENT DOCUMENTS

| | | | |
|---|---|---|---|
| 2020/0285746 A1* | 9/2020 | Buendgen | G06F 21/44 |
| 2021/0117176 A1* | 4/2021 | Watt | G06F 8/71 |
| 2022/0222357 A1 | 7/2022 | Buendgen | |
| 2023/0155984 A1 | 5/2023 | Mircea | |

OTHER PUBLICATIONS

Buendgen, R., "Updating Secure Guest Metadata of a Specific Guest Instance", United Kingdom Patent Application: 2217785.1, Filed on Nov. 28, 2022, 44 pgs.

"Notification of Transmittal of the International Search Report and the Written Opinion of the International Searching Authority, or the Declaration", From the International Searching Authority, Date of mailing: Feb. 14, 2024, Applicant's or agent's file reference: P202203174PCT01, International filing date: Nov. 17, 2023, 11 pgs.

Cappos, et al., "Stork: Package Management for Distributed VM Environments", 21st Large Installation System Administration Conference (LISA '07), Server date: Oct. 25, 2007, Downloaded by EPO on Apr. 11, 2013, 16 pgs.

* cited by examiner

UPDATING SECURE GUEST METADATA OF A SPECIFIC GUEST INSTANCE

BACKGROUND

Field of the Invention

The invention relates generally to a method for modifying metadata of a secure guest instance, and more specifically, to a computer-implemented method for securely modifying metadata of a secure guest instance that is personalized by an initialization code, wherein the secure guest instance originates from a generic boot image, using a trusted firmware that maintains metadata of the secure guest instance. The invention relates further to a related security system for a secure modification of metadata of a secure guest instance, and a computer program product.

Related Art

The security of data and communication channels still continues to have one of the highest priorities for the management of corporate IT (information technology). This is not only necessary due to government regulations (e.g., GDPR, EU General Data Protection Regulation), but also because of the loss of credibility for companies that do not reliably protect customer data at all times—and can avoid lost sales and profits—if compromised customer data records are compromised. Additionally, fines may have to be paid depending on the country of the data breach. It turns out that data protection and the provision of secure computing platforms is not just a software issue, it also involves hardware modules. This may not yet be a natural environment for mass-market CPU-chips used in microcontrollers, personal computers, mobile phones or home automation devices. However, for highly trusted enterprise-class computing environments, such as those used in the financial, insurance, or government industries, it is essential to be able to demonstrate that, from a technological perspective, data breaches have a very high probability of being prevented. This may require some additional high-tech components and supporting processes. However, the associated success in terms of data security pays off for the additional effort.

These thoughts are also applicable to trusted and/or confidential computing environments in which secrets, like cryptographic keys used by virtual machines (also denoted as guests) or software containers running on/in hypervisors can practically not be accessed by the hypervisor or related software management and configuration programs. Nevertheless, also in such computing environments breaches of the fundamental security rules, such as an exposure of a secret key or usage of a secret key for a secure guest image through the hypervisor, continue to be possible. This may also be possible in environments in which hardware security modules (HSMs) have been in use for quite some time.

There are already some disclosures that fit into the context of the computer-implemented method for personalizing a secure guest instance from a generic boot image using a trusted firmware that maintains metadata of the secure guest instance. Document US 2020/0 076 607 A1 describes how a secret is securely maintained on a virtual computer system by configuring a specialized virtual machine to manage and maintain the sequent on behalf of an application. When the application requests access to the secret, a controlling domain, in combination with the specialized virtual machine, validates that the application is authorized to make the request and that the application was not compromised prior to the request.

There are already a few ideas in connection with secure computing: Document US 2020/0 076 607 A1 describes how a secret is securely maintained on a virtual computer system by configuring a specialized virtual machine to manage and maintain the sequent on behalf of an application. When the application requests access to the secret, a controlling domain, in combination with the specialized virtual machine, validates that the application is authorized to make the request and that the application has not been compromised prior to making the request.

Additionally, document US 2020/0 159 940 A1 describes a method for sharing secret data between multiple containers. Here, in response to an initial booting of an operating system instance of a container, a unique operating system identifier is generated for the operating system instance. A grant authority stores the unique operating system identifier in a reserved area of a secure storage device. Furthermore, in response to a request from the operating system instance to access secret data and the secure storage device, the grant authority determines whether the unique operating system identifier is stored in the secure storage device.

Problems in such confidential computing environments can be identified in the context of an image of the secure guest to be executed on a hypervisor. E.g., a user taking owner ship of a secure gest instance started using a generic secure guest image provided by software vendor wants to modify metadata of the secure guest instance, where the metadata are only accessible by trusted firmware and the metadata pertains to the specific secure guest instance owned by the user. In such a situation, it must not be possible to steal the data comprising secrets, using the stolen data, and add the secret to a secure guest instance of an attacker; and an attacker must not be able to access data comprising a secret known to the attacker that can be added to the metadata of a vulnerable secure guest. Technologies such as openCryptoki or CCA (Common Cryptographic Architecture) cannot yet elegantly meet this requirement.

Hence, there may be a need to provide a secure method between a virtual machine executed on a hypervisor and trusted firmware such that the virtual machine and its metadata cannot be compromised by an attacker.

SUMMARY OF THE INVENTION

According to one aspect of the present invention, a computer-implemented method for securely modifying metadata of a secure guest instance that is personalized by an initialization code, wherein the secure guest instance originates from a generic boot image, using a trusted firmware that maintains metadata of the secure guest instance may be provided. The method may comprise starting a secure guest instance using a hypervisor based on the generic boot image, receiving, by the secure guest instance, user specific data, and personalizing, by the secure guest instance, the secure guest instance using the user specific data.

Furthermore, the method may comprise receiving a request structure by the secure guest instance for modifying the metadata of the secure guest instance, verifying partially the request structure by the secure guest instance using the user specific data and upon successful—i.e., if verified, in particular, partially—verification passing the request structure to the trusted firmware for modifying the metadata of the secure guest instance, the trusted firmware verifying the request structure and upon success modifying the metadata as specified by the request structure.

According to another aspect of the present invention, a security system for a secure modification of metadata of a secure guest instance that is personalized by an initialization code, wherein the secure guest instance originates from a generic boot image, using a trusted firmware that maintains metadata of the secure guest instance may be provided. The system may comprise a processor and a memory operational coupled to the processor, where the memory stores program code portions, which when executed by the processor enable the processor to start a secure guest instance using a hypervisor based on the generic boot image, to receive user specific data using the secure guest instance, and to personalize, using the secure guest instance, the secure guest instance using the user specific data.

Moreover, the processor may also be enabled to receive a request using the secure guest instance structure for modifying the metadata of the secure guest instance, to verify partially, using the secure guest instance, the request structure using the user specific data, and upon—in particular partial—successful verification passing the request structure to the trusted firmware for modifying the metadata of the secure guest instance.

Last but not least the processor may also be enabled to verify the request structure using the trusted firmware, and, if successful, modify the metadata as specified by the request structure.

The proposed computer-implemented method for securely modifying metadata of a secure guest instance that is personalized by an initialization code, wherein the secure guest instance originates from a generic boot image, using a trusted firmware that maintains metadata of the secure guest instance may offer multiple advantages, technical effects, contributions and/or improvements:

Using techniques proposed here it may become practically impossible to change metadata in a trusted firmware of a confidential computing environment by an unauthorized virtual guest system or instance. The proposed architecture may generally and finally prohibit change requests to the metadata of another secure guest instance.

As a result, it may still be possible to modify metadata associated with a specific secure guest instance, but only through the specific secure guest instance. However, after a freeze request not anybody may modify the metadata of the specific secure guest instance, including the specific secure guest instance.

This, in turn, may allow dividing the startup process of a secure guest instance in two parts: (i) A first part, where metadata is modified and where access to the secure guest instance is very much limited, and (ii) a second part, where the metadata may be fix but more general access to the secure guest instance may be allowed, such that an attack via the more general access path cannot modify any metadata.

This may increase the operational security of confidential computing environments also in cases where the hypervisor that builds the operational basis for the virtual machines or secure guest instances may be corrupted. The same may apply for the communication channel between the secure guest instance and the related metadata area of the trusted firmware. If this communication channel may be compromised, it is architecturally impossible to change this very those metadata from and to another secure guest instance.

Additionally, the proposed method may allow to ensure that the metadata of a secure guest instance can only be modified by the owner of the data used to take ownership of the secure guest instance by requiring a cryptographic linkage between a request structure and user data, which, in turn, may require that the creators of the request structure and the data used to take ownership of a secure guest instance share a secret.

In the following, additional embodiments of the inventive concept—applicable for the method as well as for the system—will be described.

(2) According to an advantageous embodiment of the method, subsequent to passing one or more request structures to the trusted firmware, a metadata freeze request—i.e., e request for freezing the metadata—may be passed or submitted to the trusted firmware by the secure guest instance, whereupon the trusted firmware may reject all subsequent requests from the secure guest instance to modify its metadata. Now, not any unauthorized changes to metadata would be accepted anymore. Hence, also not any other virtual machine or secure guest instance is able to compromise the metadata of the secure guest image which has initiated the first metadata change for its own use.

(3) According to another advantageous embodiment, the method may also comprise allowing general access to the secure guest instance by the secure guest instance only after passing the freeze metadata request to the trusted firmware. Consequently, in particular input/output accesses—e.g., over a network—may not be executed before sending/receiving the freeze request. As a technical consequence, not any unauthorized metadata changes by users or virtual machines would be possible—e.g., hackers who control these virtual machines. It will now be technically impossible to perform such attacks even if an attacker would be able to traverse the barrier of general input/output channels—e.g., by a network—all the secure guest instance, and even if the attacker would be able to manipulate a partial integrity test program used by the request structure.

According to a preferred embodiment of the method, the starting of the secure guest instance may also comprise passing, by the hypervisor, a generic boot image and protected metadata to the trusted firmware, and then starting the secure guest image by the trusted firmware based on the metadata. This can be seen as being equivalent to build or generate the secure guest instance According to a useful embodiment of the method, each request structure may be integrity protected, and the request structure may only be fully (i.e. completely) verifiable by the trusted firmware—i.e., in the sense of the entire request structure and not only in parts. Other components may be able to partially verify the request structure in the sense that just a part of the request structure can be verified, e.g. by the guest instance. In particular, the integrity protection may ensure that a replacement of the user data field in request structure will be detected by the trusted firmware.

According to an advanced embodiment of the method, a request structure may comprise an image measurement value, and the method may comprise rejecting the passed-over request structure, by the trusted firmware, if the measurement value of a boot image of the secure guest instance does not match the image measurement value. Thereby, the image measurement value may be any sequence of characters or numbers or mixture thereof, or even any digital bit sequence. Hence, the request structure may only be used with secure guest instances started from a specific secure guest image which determines the personalization procedures and the partial verification procedures available to the secure guest instance.

According to an interesting embodiment of the method, the request structure may comprise encrypted data that may only be decryptable by the trusted firmware. Technically, now it may become very hard, if not impossible, to attack the transmission—i.e., the passing—of secrets in an encrypted part the request structure from the secure guest instance to the trusted firmware. Also the hypervisor is excluded from learning all contents of the request structure even if it is architecturally positioned between the secure guest instance and the trusted firmware.

According to a permissive embodiment of the method, the encrypted data of a request structure may comprise a secret to be added to the metadata of the secure guest instance. Such a secret may be used during subsequent procedures performed by the secure guest instance. Such a secret may be protected against access by an intruder into the secure guest instance. The firmware may use secrets in the metadata to associate devices (e.g. HSMs) to a secure guest instance. Technically, this may significantly reduce the chances of an attacker being able to steal the secret directly from the secure guest instance.

According to a further optional embodiment of the method, the request structure may comprise a plaintext user data field that will not be interpreted by the trusted firmware, while still being subject to the integrity check of the request structure performed by the trusted firmware. Such a plaintext user data field may be used to ensure the author of the request structure is also the author of the user specific data presented to the secure guest instance, by making sure the subject providing data upon which the secure guest instance will be personalized and the author of the request structure share a common secret. Which depending on the trust model used means they trust each other or are the same entity.

According to an additionally useful embodiment of the method, the user data field in the request structure may comprise user data and an integrity tag, where the user data may be cryptographically linked to the user specific data. Both may be the same or, the user data may be a hash value, message authentication code or signature of the user specific data. In this embodiment, also the following feature may be useful: the integrity tag—e.g., a digital signature—may cryptographically link the user data with the data on the request structure outside of the user data field. Hence, the integrity tag may be used as a signature for all fields of the request structure apart from the integrity tag. This may be an additional security feature for the request structure in transition, e.g., on its way from the secure guest instance to the trusted firmware.

According to an enhanced embodiment of the method, the partially verifying of the request structure by the secure guest instance may comprise verifying a cryptographic link between user specific data and the user data in the request structure. This may, e.g., be performed by proving that the user data is a hash value of the user specific data. This embodiment may also comprise verifying the cryptographic link between user data in the request structure and the data in the request structure outside the user data field. This may be performed by proving that the integrity tag in the user data field is a signature of all fields of the requests structure apart from the integrity tag field itself. Hence, a link is established between the user-specific data and the use of data as well as the user data with the request structure. Hence, a digital link exists between the user-specific data and the request structure itself. Consequently, if no such link could be proven, the request structure shall not be used together with the user specific data which may further increase the security of the here proposed technical concept and security architecture.

According to an additional embodiment of the method, the user specific data may comprise a key. This may be used in the context of the trusted firmware and/or the secure guest instance. E.g., a public key used may be used to verify a digital signature. This may allow to verify the cryptographic link between the user data and the data in the request structure outside of the user data field. For this, the matching private key belonging to the signing key should belong to the creator of the user-specific data and the request structure. Using such a procedure, the secure guest instance may prove that the user-specific data and the requests structure originate from the same sender or generator by verifying the integrity tag in the user data field.

Furthermore, embodiments may take the form of a related computer program product, accessible from a computer-usable or computer-readable medium providing program code for use by or in connection with a computer or any instruction execution system. For the purpose of this description, a computer-usable or computer-readable medium may be any apparatus that may contain means for storing, communicating, propagating or transporting the program for use by or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings.

DETAILED DESCRIPTION

In the context of this description, the following technical conventions, terms and/or expressions may be used:

The term 'trusted computing environment' may denote a computing environment in which a hypervisor on any system management software having a user interface component may not access any plaintext contents or other state of a virtual machine.

The term 'secure guest' or 'secure guest instance' may denote a virtual machine or a software container comprising executable program code in a secure computing environment that is protected by a trusted execution environment such that no non-trusted component of a computer system can observe any state (memory or registers) of the running secure guest. It may be a generic guest image which may, e.g., be also provided by a third party, e.g., a software house. Typical non-trusted components are software hypervisors, hardware management consoles and other guests.

The term 'personalizing' may denote here that a secure guest instance started from a generic boot image may be changed in a way that it may lose its status as being generic, i.e., it may become a special or even unique executable image, e.g., by adding a (TLS/ssh) signing key and/or an (volume) encryption/decryption key, by limiting its capabilities by binding it to a special user (e.g., by setting passwords) or specific hardware, or the like.

The term 'initialization code' may denote any digital bit sequence—e.g., a sequence of characters such as a secret key—which may transform the generic boot instance to a personalized unique version that may be used as a bit or character sequence for the initialization of the secure guest image.

The term 'generic boot image' may denote an image of a virtual machine or an executable software container (e.g., in the sense of a Docker container) that may be provided by a party not using the boot image itself. E.g., a development team in an enterprise or a software house may provide the boot image for general use, e.g., after a download from a software repository. I.e., each user may download the same generic boot image and use it to start a generic secure guest which may get personalized during.

The term 'trusted firmware' (trusted FW or TFW) may denote a component deeply embedded into the hardware of the computing (mainframe) system which may not be accessed by any other user-controlled software. The trusted firmware may have predefined and highly secured application programming interfaces in order to protect—in a broad sense—the functioning of the trusted firmware. The trusted FW should more be seen as a deeply integrated component of the computer system instead of a service component. Communication channels to/from the trusted firmware are typically cryptographically protected.

The term 'metadata' may denote—in the classical sense, information about data—here, in particular, data required to start a virtual machine. In a confidential computing environment, such information may be used by the trusted firmware in order to start a secure virtual machine, like, e.g., may contain integrity measures of an image of a secure guest or keys needed to decrypt the image of a secure guest. These metadata may, e.g., comprise resources required, interfaces required, performance required and—in some cases—also which security measures are appropriate. The extension of the metadata—e.g., in terms of the required control information—but more specifically, in terms of the secret and secret name pair—to be used by the trusted firmware represents one of the foundations of the proposed concept.

The term 'hypervisor' may denote a well-defined type of computer software or firmware that creates and runs virtual machines or software containers. Hence, a plurality of virtual machines/software container may be executed in parallel without any risk of cross references. An error in the virtual machines may not cause any harm to another virtual machine. Each virtual machine may own a defined address room.

The term 'request structure' may denote a data structure comprising data elements—in particular, encrypted data elements—to be sent by a secure guest instance to a trusted firmware of a computer system. The request structure may, e.g., comprise a new data element to be added to the metadata maintained by the trusted firmware for the specific secure guest.

The term 'modifying the metadata' may denote that new metadata may be added to the existing ones for a specific secure guest image or that existing metadata may be modified. The respective request may comprise the indication how to modify the metadata. This may also be valid for a deletion of metadata or a change of existing metadata in the trusted firmware. It may also be noted that an add-metadata request structure or change metadata request structure may content-wise be different to each other.

The term 'freeze metadata' may denote that no changes to the metadata are technically possible after a related freeze metadata request from a secure guest instance to the trusted firmware of a computer system. Advantageously, such a freeze metadata request may be executed before the secure guest instance may be opened up for any other general I/O.

The term 'integrity-protected' may denote that it is possible to verify a validity of a data structure of a predefined form. Thereby, data comprised in the data structure itself may be used to confirm a validity of the complete data structure. For this, a measurement value—e.g., the total number of bytes, cryptographic hashes, message authentication codes or signatures of the data structure—e.g., a boot image of a virtual machine—or a UUID of the data structure may be used.

The term 'image measurement value' may denote the measurement value mentioned in the paragraph just above.

The term 'encrypted data' may denote data that are not available in plaintext but that have been modified using a predefined key. The encrypted data can be made readable in plaintext again after a decryption process.

The term 'cryptographically linked' may denote that two pieces of data belong together and may be proven to belong together by a cryptographical link. Means to establish such cryptographic links may be encrypted hashes, message authentication code (MAC) or a digital signature. A typical way to link two pieces of data is to hash, MAC or sign the concatenation of the two pieces of data and make the resulting integrity tag available together with the two pieces of data.

In the following, a detailed description of the figures will be given. All instructions in the figures are schematic. Firstly, a block diagram of an embodiment of the inventive computer-implemented method for securely modifying metadata of a secure guest instance that is personalized by an initialization code, wherein the secure guest instance originates from a generic boot image, using a trusted firmware that maintains metadata of the secure guest instance is given. Afterwards, further embodiments, as well as embodiments of the related security system for a secure modification of metadata of a secure gest instance will be described.

Figure 1:
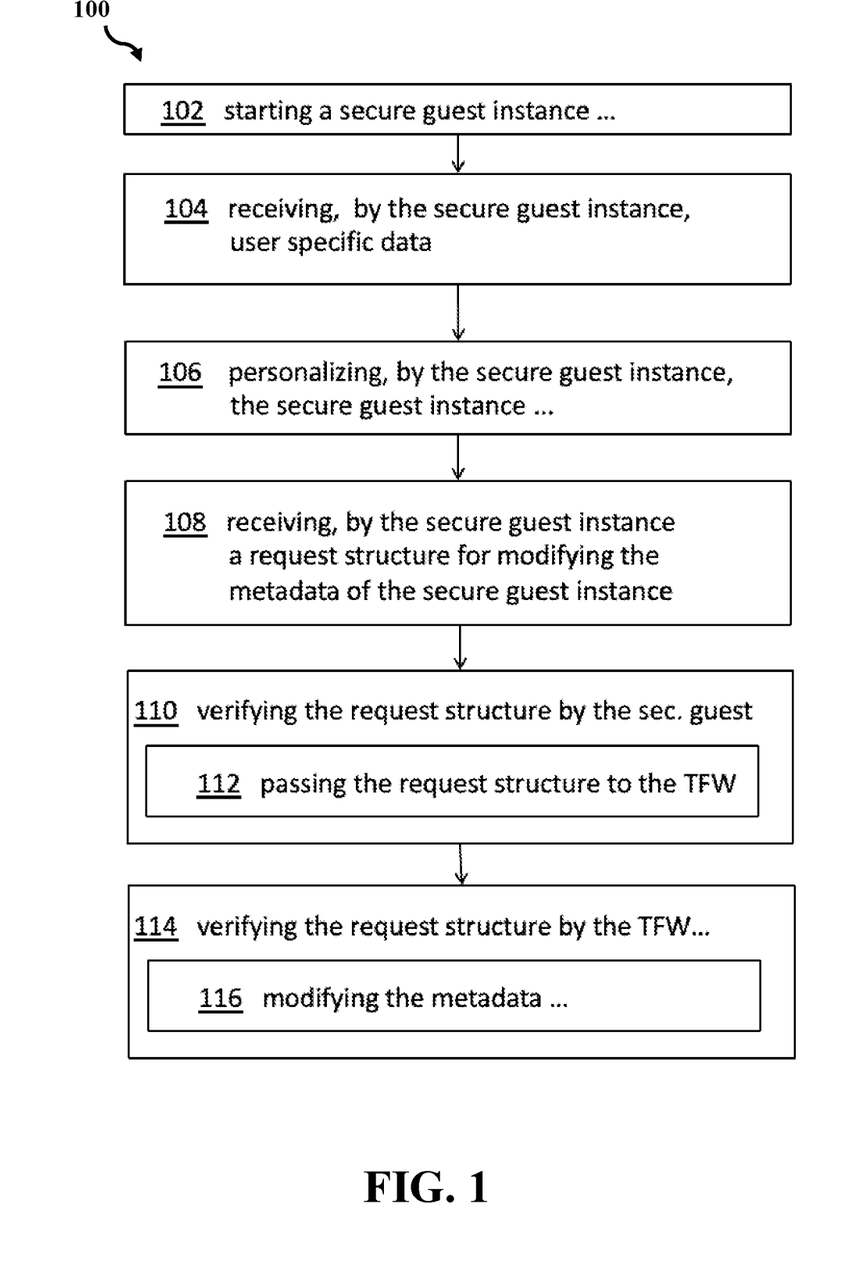
FIG. 1 shows a flowchart of an embodiment of the inventive computer-implemented method for securely modifying metadata of a secure guest instance that is personalized by an initialization code, wherein the secure guest instance originates from a generic boot image, using a trusted firmware that maintains metadata of the secure guest instance.

FIG. 1 shows a block diagram of a preferred embodiment of the computer-implemented method 100 for securely modifying metadata of a secure guest instance that is personalized by an initialization code. Thereby, the secure guest instance originates from a generic boot image. The complete method is supported using a trusted firmware that maintains metadata of the secure guest instance. And the method shall be part of a trusted computing environment, as defined above.

The method 100 comprises starting, 102, a secure guest instance using a hypervisor based on the generic boot image, receiving, 104, user-specific data by the secure guest instance. These can be used for the next step, namely, a next element of the method 100, i.e., personalizing, 106, the secure guest instance by the secure guest instance using the user specific data. Hence, the secure guest instance will personalize itself.

Furthermore, the method 100 comprises receiving, 108, a request structure by the secure guest instance for modifying the metadata of the secure guest instance. No special source of request structure needs to be given as it may be received from anywhere, e.g., read from a file, received via a network connection or the like.

Additionally, the method 100 comprises partially verifying, 110, the request structure by the secure guest instance, in particular, in the sense that the complete request structure does not have to be verified because the user data field belongs to the rest of request. Thereby, the user-specific data are used. Upon a successful partial verification, the method 100 comprises passing, 112—in particular, by the secure guest instance—the request structure to the trusted firmware for modifying the metadata of the secure guest instance.

Last but not least, the method 100 comprises verifying, 114—in the sense of integrity checking directly after a reception—the complete request structure by the trusted firmware. Upon success of the verification, the method 100 comprises modifying, 116, the metadata, as specified by the request structure.

It may be noted that the secure guest instance performs only a partial integrity check based on the integrity check comprised in the user data field, while the trusted firmware performs an integrity check based on the integrity tag related to the whole request structure.

Figure 2:
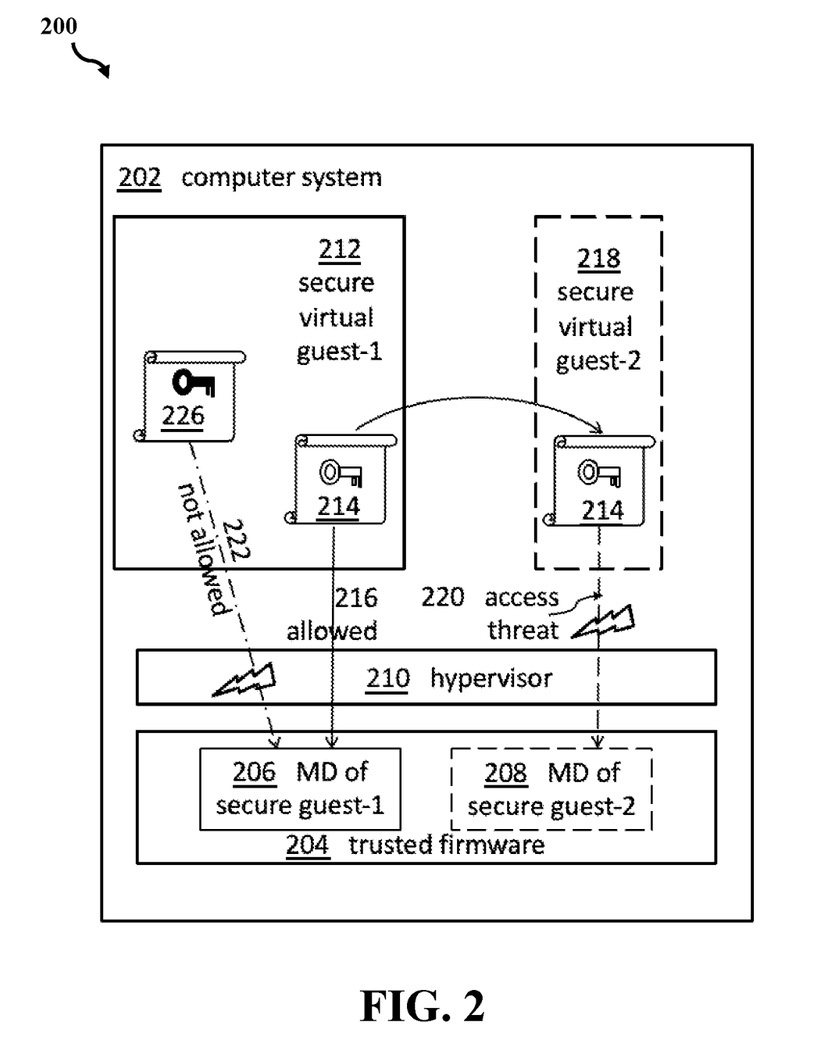
FIG. 2 shows a block diagram of constituents of a scenario of potential security attacks.

FIG. 2 shows a block diagram 200 of constituents of a scenario of potential security attacks. The computer system 202 may comprise an integrated trusted firmware 204 on which a hypervisor 210 is operated which builds the operational basis for the secure virtual guest-1 212 and other secure virtual guest instances, like, the secure virtual guest-2 218. Also shown are metadata (MD) 206 of the secure guest-1 212 and metadata 208 of the secure guest-2 218.

These metadata can—e.g., in the sense of "add", "change", "delete"—be modified ("allowed" 216) according to a secure request structure. In the case of secure virtual guest-1 212, this is the secure request structure 214.

However, if the secure virtual guest-2 218 wants to attempt to use the secure request structure 214 to modify its own metadata 208 in the trusted firmware 208, this should not be allowed, as indicated by the figure by the access threat 220.

Equivalently, it should also not be possible for the secure virtual guest-1 212 to use another request structure 226 secured by another key to modify the metadata 206 of the secure guest-1 212. Also this is indicated as not allowed, 222.

Figure 3:
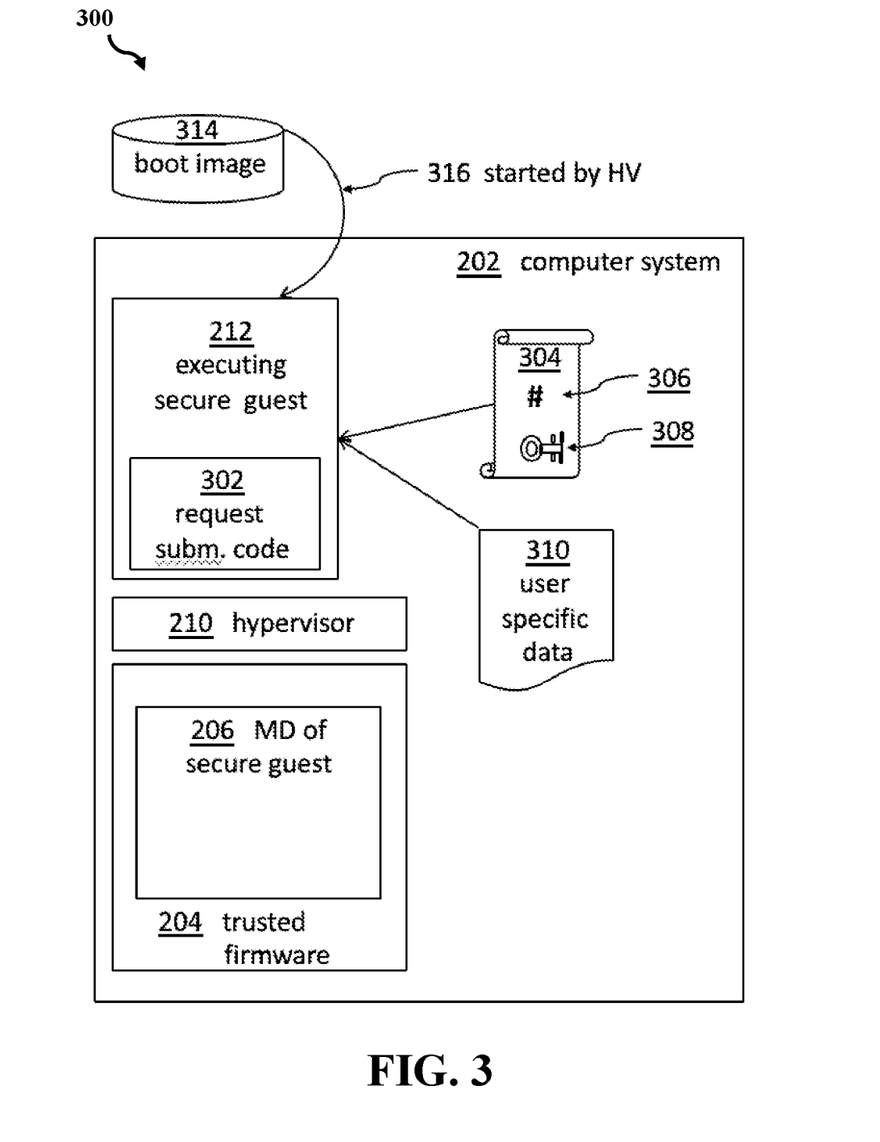
FIG. 3 shows a block diagram of an embodiment comprising components instrumental for the concept proposed here.

FIG. 3 shows a block diagram 300 of an embodiment comprising components instrumental for the concept proposed here. As in FIG. 2, the computer system 202, the trusted firmware 204 and the metadata 206 of the secure guest 212 (which is being executed on the hypervisor 210) are shown. Furthermore, the generic boot image 314 is shown which is used to start, 316, the secure guest instance 212. Additionally shown is the request submission code 302 as well as the secure add secret request structure 304 comprising a user data measurement value 306 and a new secret to be added to the secure guest metadata 206, as well as user-specific data 310. The request submission code can be used to submit request structures to modify metadata (including add-secret request structures) as well as requests to freeze metadata. Additional details regarding the add-secret request structure will be discussed in the context of FIG. 4.

Figure 4:
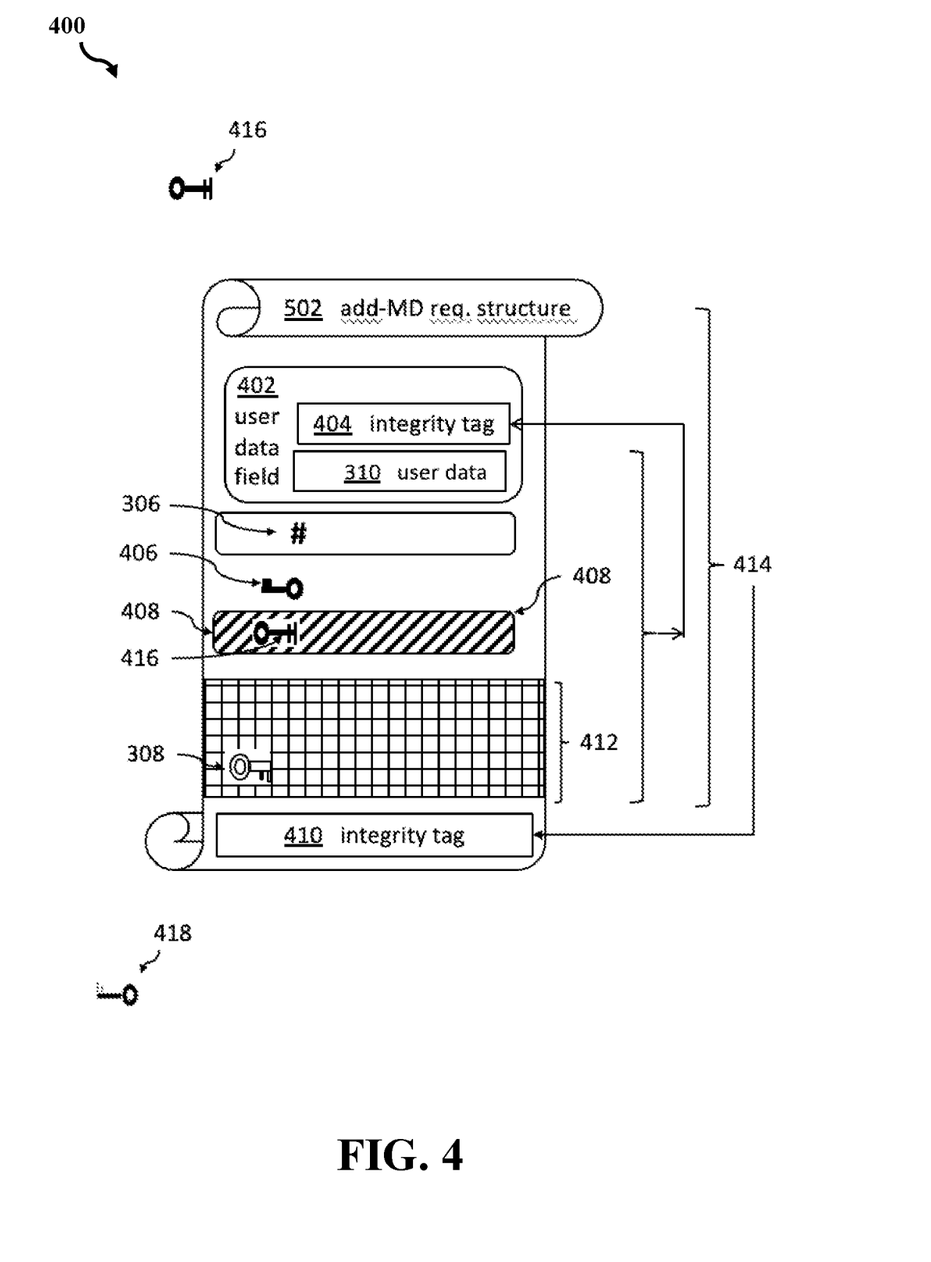
FIG. 4 shows an embodiment of an add-secret-request structure according to an embodiment.

FIG. 4 shows an embodiment of an add-secret-request structure 400 according to an embodiment with which metadata of the trusted firmware (compare FIG. 3) should be changed. These initial metadata are provided protected metadata. The request structure 400 itself comprises a plurality of elements: the user data field 402 comprise user data 310, as well as an integrity tag 404; the image measurement value 306; an ephemeral public customer key 406; and a key slot storage 408 comprising one key for each host system.

Each one of these key slots comprises a hash value of a public host key 418 and a request protection key (RPK) 416, encrypted using a public host key 418 and private host key (not shown). The private host key is securely stored in the trusted firm and only accessible by the trusted firmware. The area 412 comprising data for the metadata update 308 (e.g., a new secret) is encrypted by a request protection key (RPK) 416. Furthermore, the add-secret-request structure 400 comprises the integrity tag 410. This is used for the integrity check of the complete request structure, auxiliary be denoted with reference numerical 414. Also here, the RPK 412 is used as a protective mechanism, e.g., as an HMAC or AES-GCM key.

The inner part of the request structure (summarized by the left one of the two shown brackets) is integrity-protected by the integrity tag 404 of the user data field 402. This inner part comprises all of the request structure with the exception if the two integrity tags 404 and 410. Hence, the request structure 400 can either be partially integrity checked by the secure guest instance using the user data integrity tag 404 or, it can be completely integrity checked—apart from the integrity tag 410—by the trusted firmware using the integrity tag 410 of the complete request structure and the RPK 416 which can only be revealed by the trusted firmware.

Figure 5:
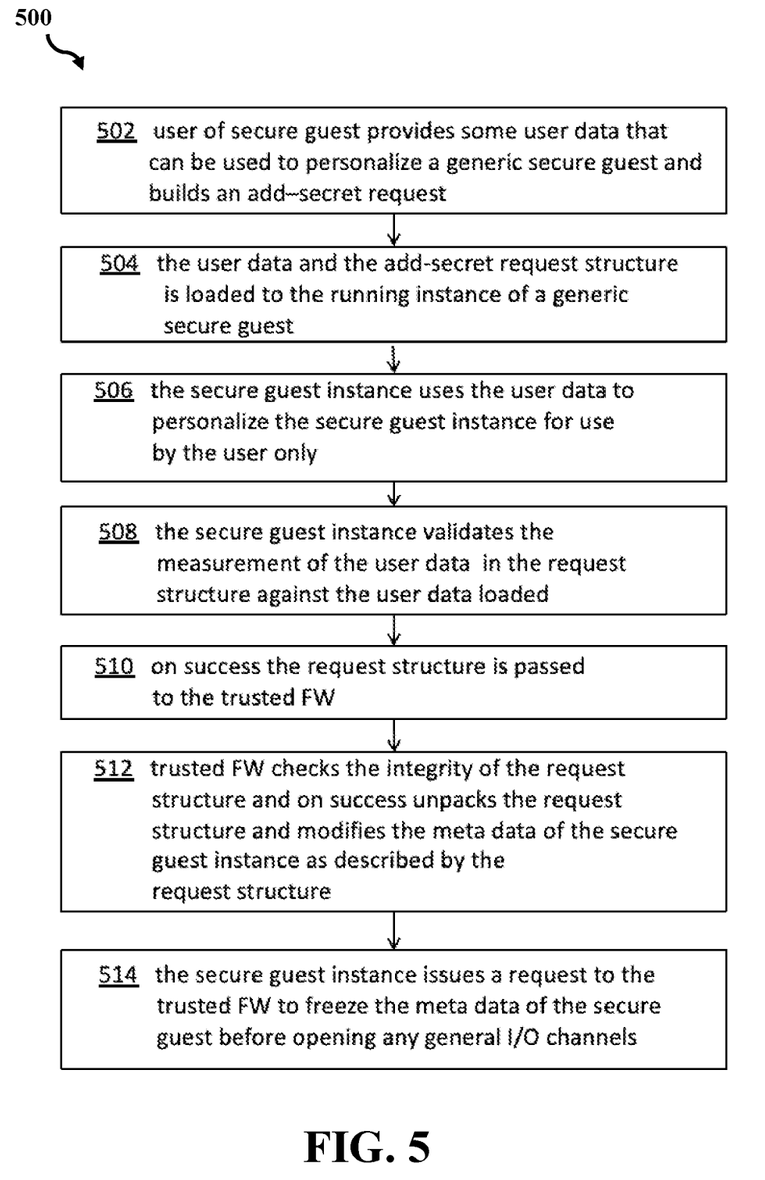
FIG. 5 shows a flowchart of a more implementation-near sequence of activities for the concept proposed here.

FIG. 5 shows a flowchart 500 of a more implementation-near sequence of activities for the concept proposed here. Firstly, a user of a secure guest instance provides some user specific data that can be used to personalize a generic secure guest. Furthermore, the uses of the secure guest instance can also build an add-secret request structure, 502. Next, the user data and the add-secret request structure is loaded to the running—i.e., executing—instance of a generic secure guest image, 504.

Then, the secure guest instance uses the user data to personalize the secure guest instance for use by the user only, 506. This represents the previously described self-personalization. As a next step, the secure guest instance validates of the user data in the request structure against the user specific data loaded, and partially verifies the request structure based on key material included in the user specific data and the integrity tag in the user data field of the request structure, 508. Upon a successful verification, the request structure is passed to the trusted firmware, 510.

Furthermore, the trusted firmware checks the integrity of the request structure, and—if successful—unpacks the request structure and modifies the metadata of the related secure guest instance as defined by the request structure, 512.

Last but not least, the secure guest instance issues a request to the trusted firmware (FW) to freeze the metadata of the secure guest instance before opening any general I/O channels, 514. With this, the instantiation of the secure guest instance is finalized.

Figure 6:
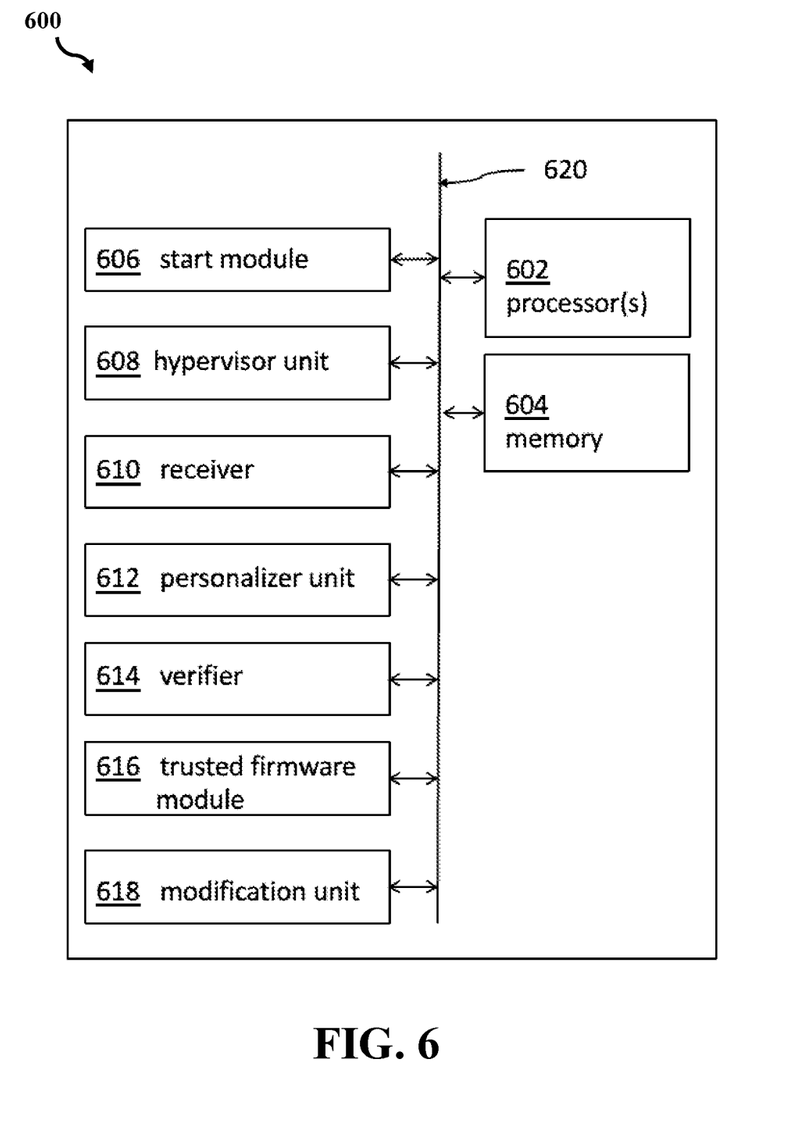
FIG. 6 shows a block diagram of an embodiment of the inventive security system for a secure modification of metadata of a secure guest instance that is personalized by an initialization code, wherein the secure guest instance originates from a generic boot image, using a trusted firmware that maintains metadata of the secure guest instance.

FIG. 6 shows a block diagram of an embodiment of the inventive security system for a secure modification of metadata of a secure guest instance that is personalized by an initialization code, wherein the secure guest instance originates from a generic boot image, using a trusted firmware that maintains metadata of the secure guest instance.

The security system comprises a processor 602 and a memory 604 operational coupled to the processor 602, where the memory 604 stores program code portions, which, when executed by the processor 602 enable the processor 602 to start a secure guest instance—in particular, by a start module 606—using a hypervisor—e.g. a hypervisor unit 608—based on the generic boot image. The processor 602 is also enabled to receive, using a receiver 610 of the secure guest instance, user-specific data, and to personalize—e.g., using a personalizer module 612 of the secure guest instance—the secure guest instance using the user-specific data.

Then, the processor 602 of the security system 600 is enabled to receive—e.g., using the receiver 610 of the secure guest instance—a request structure for modifying the metadata of the secure guest instance, and to verify partially—e.g., using a verifier 614 of the secure guest instance—the request structure using the user specific data.

Upon successful verification, the processor 602 of the secure system 600 is also enabled to pass the request structure to the trusted firmware 616 (compare 204, FIGS. 2, 3) for modifying the metadata of the secure guest instance.

Moreover, the processor 602 is enabled to verify the request structure—e.g., using a trusted firmware module. Upon a successful verification, the processor 602 is enabled to modify the metadata as specified by the request structure, e.g., using a modification 618.

It shall also be mentioned that all functional units, modules and functional blocks—in particular, the process on 602, the memories 604, the start module 606, the hypervisor unit 608, the receiver 610, the personalizer unit 612, the verifier 614, the trusted firmware module 616 (optionally, also comprising one or more processors), and the modification unit 618—may be communicatively coupled to each other for signal or message exchange in a selected 1:1 manner. Alternatively the functional units, modules and functional blocks can be linked to a system internal bus system 620 for a selective signal or message exchange.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
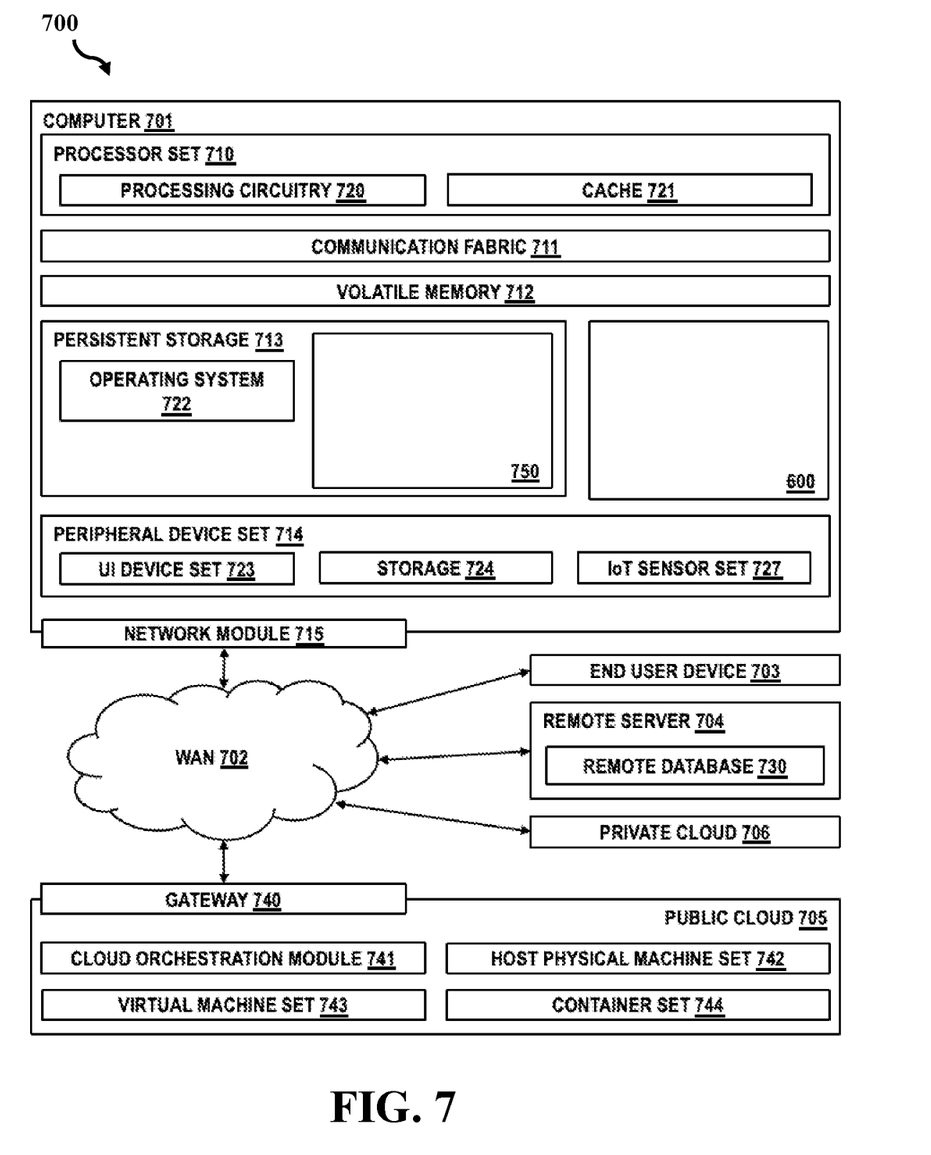
FIG. 7 shows an embodiment of a computing system comprising the security system according to FIG. 6.

FIG. 7 shows a computing environment 700 comprising an example of an environment for the execution of at least some of the computer code involved in performing the inventive methods, such as the computer-implemented method for securely modifying metadata of a secure guest instance that is personalized by an initialization code, wherein the secure guest instance originates from a generic boot image, using a trusted firmware that maintains metadata of the secure guest instance 750.

In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI), device set 723, storage 724, and Internet of Things (IOT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (e.g., embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

It should also be mentioned that the security system (600, compare FIG. 6) for a secure modification of metadata of a secure guest instance, which is personalized by an initialization code, can be an operational sub-system of the computer 701 and may be attached to a computer-internal bus system.

The terminology used herein is for the purpose of describing particular embodiments only and is not intended to limit the invention. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized by the following clauses:

Clause 1: A computer-implemented method for securely modifying metadata of a secure guest instance that is personalized by an initialization code, wherein the secure guest instance originates from a generic boot image, using a trusted firmware that maintains metadata of the secure guest instance, the method comprising: starting a secure guest instance using a hypervisor based on the generic boot image;

receiving, by the secure guest instance, user-specific data; personalizing, by the secure guest instance, the secure guest instance using the user specific data; receiving, by the secure guest instance, a request structure for modifying the metadata of the secure guest instance; verifying partially, by the secure guest instance, the request structure using the user specific data and upon successful verification; passing the request structure to the trusted firmware for modifying the metadata of the secure guest instance; verifying, by the trusted firmware, the request structure and upon success; and modifying the metadata, as specified by the request structure.

Clause 2: The method according to clause 1, wherein subsequent to passing one or more request structures to the trusted firmware includes: passing, by the secure guest instance to the trusted firmware, a metadata freeze request, whereupon the trusted firmware rejects all subsequent requests by the secure guest instance to modify its metadata.

Clause 3: The method according to clause 2, also comprising: allowing, by the secure guest instance, general access to the secure guest instance only after passing the freeze metadata request to the trusted firmware.

Clause 4: The method according to any of the preceding clauses, wherein the starting of the secure guest instance comprises: passing, by the hypervisor, a generic boot image and protected metadata to the trusted firmware, and starting, by the trusted firmware, the secure guest image based on the metadata.

Clause 5: The method according to any of the preceding clauses, wherein each request structure is integrity protected, and wherein the request structure is fully verifiable only by the trusted firmware.

Clause 6: The method according to any of the preceding clauses, wherein a request structure comprises an image measurement value, and wherein the method comprises: rejecting, by the trusted firmware, the passed request structure if the measurement value of a boot image of the secure guest instance does not match the image measurement value.

Clause 7: The method according to any of the preceding clauses, wherein the request structure comprises encrypted data that is only decryptable by the trusted firmware.

Clause 8: The method according to clause 6, wherein the encrypted data of a request structure comprise a secret to be added to the metadata of the secure guest instance.

Clause 9: The method according to any of the preceding clauses, wherein the request structure comprises a plaintext user data field that will not be interpreted by the trusted firmware, while still being subject to the integrity check of the request structure performed by the trusted firmware.

Clause 10: The method according to clause 9, wherein the user data field in the request structure comprises user data and an integrity tag, wherein the user data is cryptographically linked to the user specific data, and wherein the integrity tag is cryptographically linked the user data with the data in the request structure outside the user data field.

Clause 11: The method according to clause 10, wherein the partially verifying of the request structure by the secure guest instance comprises: verifying a cryptographic link between user specific data and the user data in the request structure, and verifying the cryptographic link between user data in the request structure and the data in the request structure outside the user data field.

Clause 12: The method according to clause 10, wherein the user specific data comprises a key.

Clause 13: A security system for a secure modification of metadata of a secure guest instance that is personalized by an initialization code, wherein the secure guest instance originates from a generic boot image, using a trusted firmware that maintains metadata of the secure guest instance, the security system comprising: a processor and a memory operational coupled to the processor, where the memory stores program code portions, which when executed by the processor enable the processor to: start a secure guest instance using a hypervisor based on the generic boot image; receive, using the secure guest instance, user-specific data; personalize, using the secure guest instance, the secure guest instance using the user-specific data; receive, using the secure guest instance, a request structure for modifying the metadata of the secure guest instance; verify partially, using the secure guest instance, the request structure using the user-specific data and upon successful verification; passing the request structure to the trusted firmware for modifying the metadata of the secure guest instance; verify, using the trusted firmware, the request structure and upon success; and modify the metadata, as specified by the request structure.

Clause 14: The security system according to clause 13, wherein subsequent to passing one or more request structures to the trusted firmware, the processor is also enabled to: pass, using the secure guest instance to the trusted firmware, a metadata freeze request, whereupon the trusted firmware under control of the processor rejects all subsequent requests by the secure guest instance to modify its metadata.

Clause 15: The security system according to clause 14, also comprising: allowing, by the secure guest instance, general access to the secure guest instance only after passing the freeze metadata request to the trusted firmware.

Clause 16: The security system according to any of the clause 13 to 15, wherein the processor is also enabled during the start of the secure guest instance to: pass, using the hypervisor, a generic boot image and protected metadata to the trusted firmware, and start, using the trusted firmware, the secure guest image based on the metadata.

Clause 17: The security system according to any of the clause 13 to 16, wherein each request structure is integrity protected, and wherein the request structure is fully verifiable only by the trusted firmware.

Clause 18: The security system according to any of the clause 13 to 17, wherein a request structure comprises an image measurement value, and wherein the processor is also enabled to: reject, using the trusted firmware, the passed request structure if the measurement value of a boot image of the secure guest instance does not match the image measurement value.

Clause 19: The security system according to any of the clause 13 to 18, wherein the request structure comprises encrypted data that is only decryptable by the trusted firmware.

Clause 20: The security system according to clause 19, wherein the encrypted data of a request structure comprise a secret to be added to the metadata of the secure guest instance.

Clause 21: The security system according to any of the clause 13 to 20, wherein the request structure comprises a plaintext user data field that will not be interpreted by the trusted firmware, while still being subject to the integrity check of the request structure performed by the trusted firmware.

Clause 22: The security system according to clause 21, wherein the user data field in the request structure comprises user data and an integrity tag, wherein the user data is cryptographically linked to the user-specific data, and wherein the integrity tag is cryptographically linked to the user data with the data in the request structure outside the user data field.

Clause 23: The security system according to clause 22, wherein during the partially verification of the request structure by the processor using the secure guest instance, the processor is also enabled to: verify a cryptographic link between user-specific data and the user data in the request structure, and verify, the cryptographic link between user data in the request structure and the data in the request structure outside the user data field.

Clause 24: The security system according to clause 22, wherein the user-specific data comprises a key.

Clause 25: A computer program product for a securely modification of metadata of a secure guest instance that is personalized by an initialization code, wherein the secure guest instance originates from a generic boot image, using a trusted firmware that maintains metadata of the secure guest instance, the computer program product comprising a computer readable storage medium having program instructions embodied therewith, the program instructions being executable by one or more computing systems or controllers to cause the one or more computing systems to: start a secure guest instance using a hypervisor based on the generic boot image; receive, using the secure guest instance, user-specific data; personalize, using the secure guest instance, the secure guest instance using the user-specific data; receive, using the secure guest instance, a request structure for modifying the metadata of the secure guest instance; verify partially, using the secure guest instance, the request structure using the user-specific data and upon successful verification; passing the request structure to the trusted firmware for modifying the metadata of the secure guest instance; verify, using the trusted firmware, the request structure and upon success, and modify the metadata, as specified by the request structure.

What is claimed is:

1. A computer-implemented method for securely modifying metadata of a secure guest instance that is personalized by an initialization code, wherein the secure guest instance originates from a generic boot image, using a trusted firmware that maintains metadata of the secure guest instance, the method comprising:
   starting a secure guest instance using a hypervisor based on the generic boot image;
   receiving, by the secure guest instance, user-specific data;
   personalizing, by the secure guest instance, the secure guest instance using the user specific data;
   receiving, by the secure guest instance, a request structure for modifying the metadata of the secure guest instance;
   verifying partially, by the secure guest instance, the request structure using the user specific data and upon successful verification passing the request structure to the trusted firmware for modifying the metadata of the secure guest instance;
   verifying, by the trusted firmware, the request structure and upon success; and
   modifying the metadata, as specified by the request structure.

2. The method according to claim 1, wherein subsequent to passing one or more request structures to the trusted firmware includes:
   passing, by the secure guest instance to the trusted firmware, a metadata freeze request, whereupon the trusted firmware rejects all subsequent requests by the secure guest instance to modify its metadata.

3. The method according to claim 2, further comprising:
   allowing, by the secure guest instance, general access to the secure guest instance only after passing the freeze metadata request to the trusted firmware.

4. The method according to claim 1, wherein the starting of the secure guest instance comprises:
   passing, by the hypervisor, a generic boot image and protected metadata to the trusted firmware; and
   starting, by the trusted firmware, the secure guest image based on the metadata.

5. The method according to claim 1, wherein each request structure is integrity protected, and wherein the request structure is fully verifiable only by the trusted firmware.

6. The method according to claim 1, wherein a request structure comprises an image measurement value, and wherein the method further comprises:
   rejecting, by the trusted firmware, the passed request structure if the measurement value of a boot image of the secure guest instance does not match the image measurement value.

7. The method according to claim 1, wherein the request structure comprises encrypted data that is only decryptable by the trusted firmware.

8. The method according to claim 7, wherein the encrypted data of a request structure comprises a secret to be added to the metadata of the secure guest instance.

9. The method according to claim 1, wherein the request structure comprises a plaintext user data field that will not be interpreted by the trusted firmware, while still being subject to the integrity check of the request structure performed by the trusted firmware.

10. The method according to claim 9, wherein the user data field in the request structure comprises user data and an integrity tag, wherein the user data is cryptographically linked to the user specific data, and wherein the integrity tag is cryptographically linked the user data with the data in the request structure outside the user data field.

11. The method according to claim 10, wherein the partially verifying of the request structure by the secure guest instance comprises:
    verifying a cryptographic link between user specific data and the user data in the request structure; and
    verifying the cryptographic link between user data in the request structure and the data in the request structure outside the user data field.

12. The method according to claim 10, wherein the user specific data comprises a key.

13. A security system for a secure modification of metadata of a secure guest instance that is personalized by an initialization code, wherein the secure guest instance originates from a generic boot image, using a trusted firmware that maintains metadata of the secure guest instance, the security system comprising:
    a processor and a memory operational coupled to the processor, where the memory stores program code portions, which when executed by the processor enable the processor to:
    start a secure guest instance using a hypervisor based on the generic boot image;
    receive, using the secure guest instance, user-specific data;
    personalize, using the secure guest instance, the secure guest instance using the user-specific data;
    receive, using the secure guest instance, a request structure for modifying the metadata of the secure guest instance;
    verify partially, using the secure guest instance, the request structure using the user-specific data and upon successful verification passing the request structure to the trusted firmware for modifying the metadata of the secure guest instance;

verify, using the trusted firmware, the request structure and upon success; and modify the metadata, as specified by the request structure.

14. The security system according to claim 13, wherein subsequent to passing one or more request structures to the trusted firmware, the processor is further enabled to:

pass, using the secure guest instance to the trusted firmware, a metadata freeze request, whereupon the trusted firmware under control of the processor rejects all subsequent requests by the secure guest instance to modify its metadata.

15. The security system according to claim 14, further comprising:

allowing, by the secure guest instance, general access to the secure guest instance only after passing the freeze metadata request to the trusted firmware.

16. The security system according to claim 13, wherein the processor is further enabled during the start of the secure guest instance to:

pass, using the hypervisor, a generic boot image and protected metadata to the trusted firmware; and start, using the trusted firmware, the secure guest image based on the metadata.

17. The security system according to claim 13, wherein each request structure is integrity protected, and wherein the request structure is fully verifiable only by the trusted firmware.

18. The security system according to claim 13, wherein a request structure comprises an image measurement value, and wherein the processor is further enabled to:

reject, using the trusted firmware, the passed request structure if the measurement value of a boot image of the secure guest instance does not match the image measurement value.

19. The security system according to claim 1, wherein the request structure comprises encrypted data that is only decryptable by the trusted firmware.

20. The security system according to claim 19, wherein the encrypted data of a request structure comprises a secret to be added to the metadata of the secure guest instance.

21. The security system according to claim 13, wherein the request structure comprises a plaintext user data field that will not be interpreted by the trusted firmware, while still being subject to the integrity check of the request structure performed by the trusted firmware.

22. The security system according to claim 21, wherein the user data field in the request structure comprises user data and an integrity tag, wherein the user data is cryptographically linked to the user-specific data, and wherein the integrity tag is cryptographically linked to the user data with the data in the request structure outside the user data field.

23. The security system according to claim 22, wherein during the partially verification of the request structure by the processor using the secure guest instance, the processor is further enabled to:

verify a cryptographic link between user-specific data and the user data in the request structure; and verify, the cryptographic link between user data in the request structure and the data in the request structure outside the user data field.

24. The security system according to claim 22, wherein the user-specific data comprises a key.

25. A computer program product for a securely modification of metadata of a secure guest instance that is personalized by an initialization code, wherein the secure guest instance originates from a generic boot image, using a trusted firmware that maintains metadata of the secure guest instance, the computer program product comprising a computer readable storage medium having program instructions embodied therewith, the program instructions being executable by one or more computing systems or controllers to cause the one or more computing systems to:

start a secure guest instance using a hypervisor based on the generic boot image;

receive, using the secure guest instance, user-specific data;

personalize, using the secure guest instance, the secure guest instance using the user-specific data;

receive, using the secure guest instance, a request structure for modifying the metadata of the secure guest instance;

verify partially, using the secure guest instance, the request structure using the user-specific data and upon successful verification passing the request structure to the trusted firmware for modifying the metadata of the secure guest instance;

verify, using the trusted firmware, the request structure and upon success; and modify the metadata, as specified by the request structure.

* * * * *